UNITED STATES PATENT OFFICE.

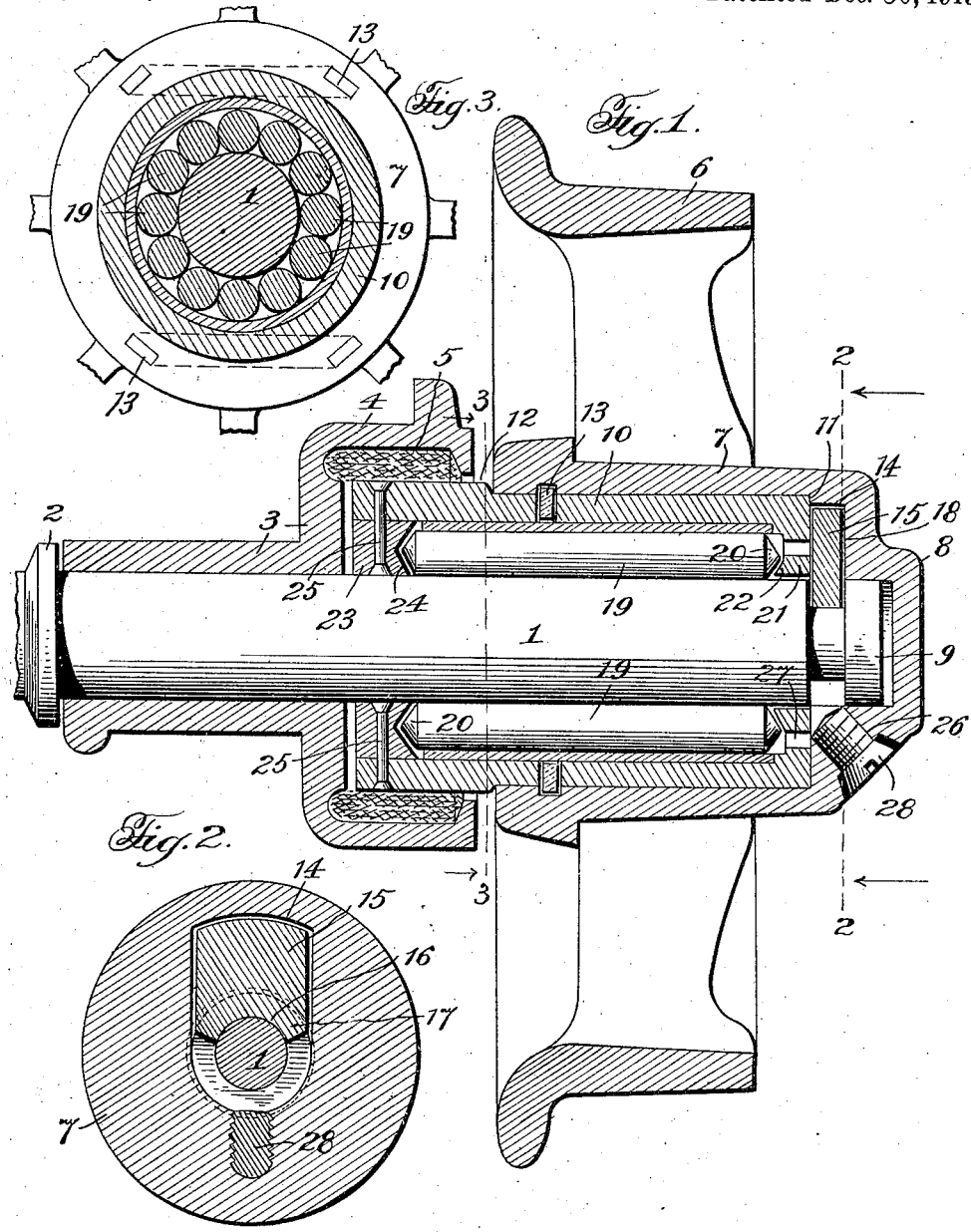
A. B. DAY.
MINING CAR WHEEL.
APPLICATION FILED MAY 14, 1918.
1,326,255.
Patented Dec. 30, 1919.
Inventor:
Alfred B. Day,
By
Brown & Means, Attorneys.
Witness:
Jas. E. Hutchinson

ALFRED BRYANT DAY, OF OLIVER SPRINGS, TENNESSEE.

MINING-CAR WHEEL.

1,326,255.

Specification of Letters Patent.   Patented Dec. 30, 1919.

Application filed May 14, 1918. Serial No. 234,486.

*To all whom it may concern:*

Be it known that I, ALFRED B. DAY, a citizen of the United States, residing at Oliver Springs, in the county of Roane and State of Tennessee, have invented certain new and useful Improvements in Mining-Car Wheels, of which the following is a specification, reference being had therein to the accompanying drawing.

My invention relates to an improvement in wheel construction and has for its object the provision of means for protecting the wheel hub from wear.

In my copending application for patent Serial No. 234,485, filed concurrently herewith, there is illustrated and described a wheel construction having in view more particularly prolonging the life of the wheel hub, and it is contemplated by the present invention to incorporate herein the same general ideas of the said application and adapt the same to wheels of the roller bearing type.

In carrying out the invention contemplated herein, it is proposed to provide a removable bushing interposed between the wheel hub and axle, the said bushing taking the form of or having operatively associated therewith means for providing a roller cage whereby to receive roller bearings between the bushing and the axle.

In the preferred embodiment of the invention it is contemplated to provide a key engagement between the wheel hub and a peripheral groove of the axle, and a combined bushing and roller cage interposed between the hub and axle, the said bushing constituting retaining means for the key.

Other features and novel details in the construction and arrangement of parts will be understood from the description hereinafter, which is to be read in connection with the accompanying drawings, forming a part hereof and wherein is disclosed for the purpose of illustration a convenient and satisfactory embodiment of the invention. In this connection, however, it is to be borne in mind that minor changes in details of parts may be resorted to and still be within the spirit of the invention.

In the drawings:

Figure 1 is a sectional view illustrating the interior construction of wheel and associated parts, the axle and roller bearings being shown in elevation;

Fig. 2 is a section substantially on the line 2—2 of Fig. 1 and looking in the direction of the arrows;

Fig. 3 is a similar section substantially on the line 3—3 of Fig. 2 and looking in the direction of the arrows.

With more particular reference to the drawings like reference numerals refer to corresponding parts throughout the several views in which 1 is an axle for a mining car, the same being preferably fixed against rotation and having an annular collar or flange 2 constituting an abutment to engage the inner end of a tubular pedestal member 3 having a sleeved engagement with the axle 1 and an enlarged annular collar 4 at the outer end of the pedestal member forming a packing chamber 5. 6 is the tread portion or periphery of the body part of the wheel proper, the latter having a hub 7 adapted to be sleeved over the axle 1 and having a closed end 8 to overlie the end 9 of the axle.

In order to prevent wear upon the hub part, a suitable bushing 10 is provided, the latter adapted at one end to abut against the shoulder part 11 of the hub and at its opposite end having a projection 12 extending beyond the inner end of the hub and adapted to be positioned within the packing chamber 5. When in position the chamber 5 is filled with suitable packing material such as felt. It will be observed that the inner end of the hub terminates at a point short of the end of the pedestal member, and the hub is protected by the bushing from wear. The bushing is removably held to the hub of the wheel as by means of transversely extending keys 13 adapted to engage registering grooves extending through the bushing and hub. The keys may take various shapes and designs, but the same are preferably of a character whereby when in position the ends may be offset or upset whereby to prevent accidental disengagement. The hub at its outer end is provided with a vertically extending groove or recess 14 adapted to receive a key block 15 whereby to maintain the latter in place against relative rotatable movement. This key block 15 at its lower end is provided with a segmental cut out part 16 whereby to provide opposed lugs or arms 17 to engage over the sides of the periphery of the axle. From the construction thus far, it will be observed that the outer end of the bushing 12 constitutes a retaining medium and abutment at one side of the key block 15 whereas the wall 18 of the hub overlying the opposite side of the key block constitutes an abutment for this surface of the key block. A series of roller bearings 19 are interposed between the bushing and axle, the roller bearings having conical terminals 20. In the preferred construction, a lining preferably of steel is provided for the inner surface of the bushing to be engaged by the rollers and thereby protect the bushing from wear. The outer end of the bushing 12 is provided with an internal annular flange 21 with an offset part 22 forming a retaining shoulder or lip for the outer terminals of the rollers. A removable collar or retaining block 23 is positioned at the inner end of the hub whereby to close the roller space, the member 23 having a groove forming opposed shoulders 24 to overlie the inner terminals of the rollers. The retaining member 23 is held in place in any desirable manner, conveniently by a rivet or bolt 25. The end of the hub is provided with an inlet opening 26 directly connecting with the annular groove of the axle and with openings 27 conveniently one for each roller projecting through the flange 21 at the outer end of the bushing. In this way the lubricant will be directly fed to the rollers and axle. The opening 26 is normally closed as by a bolt or the like 28.

When it is desired to remove the wheel the offset ends of the keys 13 are straightened and the keys removed, when the wheel with its hub may be slipped off. Thereafter the key block 15 is removed, when the bushing together with the roller bearings may be removed, the roller bearings being retained in place regardless of removal by the retaining flanges provided for this purpose at the ends of the bushing. In assembling the parts the bushing with the roller bearings are slipped over the end of the axle, the key block 15 placed in position to engage the annular groove of the axle, and then the wheel will be applied, the recess 14 of the hub being in registration with the key. Thereafter the locking keys 13 are applied as heretofore described. When in position the bushing will constitute an abutment for the key block 15, thus doing away with removable bolts or the like insertible through the wall of the hub.

What I claim is:

1. In a wheel construction, the combination of a hub part adapted to be sleeved over the end of an axle having a peripheral groove adjacent the end thereof, a bushing to be interposed between the hub part and axle, a key block constituting an abutment for the end of said bushing adapted to engage the peripheral groove of the axle and fitted to the hub, and roller bearings to be interposed between the bushing and axle, said bushing being removable, and means connected with the bushing for retaining the rollers in place upon the removal of the wheel.

2. In a wheel construction, the combination of a hub part adapted to be sleeved over the end of an axle, a bushing to be interposed between the hub part and axle, and roller bearings to be interposed between the bushing and axle, said bushing being removable, means connected with the bushing for retaining the rollers in place upon the removal of the wheel, and internal locking means interposed between the hub part and axle and constituting an abutment for one end of said bushing.

3. In combination, an axle having a peripheral groove, a hub sleeved over the end of the axle having a key block recess, a key block in said recess to engage the groove of the axle, an internal retaining means on the hub for said key block and anti-friction bearings interposed between said retaining means and axle.

4. In combination, an axle having a peripheral groove, a hub sleeved over the end of the axle having a key block recess, a key block in said recess to engage the groove of the axle, an internal retaining means on the hub for said key block, anti-friction bearings interposed between said retaining means and axle, and a tubular metallic member interposed between the roller bearings and said retaining means.

5. In a wheel construction, the combination of a wheel having a hub, a bushing positioned within the hub and projecting beyond the inner end thereof, means for removably securing the bushing in place, and anti-friction bearings to engage the axle and mounted upon said bushing.

6. In a wheel construction, the combination of a wheel having a hub, a bushing positioned within the hub and projecting beyond the inner end thereof, means for removably securing the bushing in place, anti-friction bearings to engage the axle and mounted upon said bushing, and a key block positioned within the hub adapted to engage the axle.

7. The combination of a wheel having a hub to be sleeved over the end of an axle with a peripheral groove, a key block fitted to the hub and adapted to engage the groove of the axle, a removable bushing interposed between the wheel hub and axle constituting an abutment for said key, and roller bearings interposed between the bushing and the axle.

8. A wheel construction adapted to be applied to the end of an axle having a peripheral groove, the same comprising a body part and a hub part, a removable key member to engage the peripheral groove in the axle, a bushing interposed between the hub of the wheel and axle, said bushing constituting an abutment for the key, roller bearings interposed between the bushing and axle, and means on the bushing for supporting said roller bearings in place upon the removal of the wheel.

9. In combination with an axle having a peripheral groove, a wheel having a hub part to be sleeved over the end of the axle, a key block to be positioned within the hub to engage said groove, a bushing interposed between the wheel hub and axle, said bushing constituting an abutment for the key, elongated roller bearings interposed between the bushing and axle, and said bushing having retaining means at opposite ends for the rollers.

10. In combination with an axle having a peripheral groove, a wheel having a hub part to be sleeved over the end of the axle, a key block to be positioned within the hub to engage said groove, a bushing interposed between the wheel hub and axle, said bushing constituting an abutment for the key, elongated roller bearings interposed between the bushing and axle, and said bushing having retaining means at opposite ends for the rollers, one of said means being removable to permit removal of the rollers.

11. In a wheel construction, the combination of a hub part, a bushing positioned within the hub part, means for removably securing the bushing to the hub part, roller retaining means carried by the bushing, rollers for the bushing, and a removable key block retained in place by the bushing and adapted to engage the axle to retain the hub in place.

12. In a wheel construction, the combination of a hub part adapted to be sleeved over the end of an axle having a peripheral groove, a bushing for the hub part, means for removably securing the bushing to the hub part, a key block within the hub part to engage the annular groove of the axle, roller bearings interposed between the bushing and axle, the bushing having a closed end constituting an abutment for the key block and also retaining means for the rollers, and a removable closure for the opposite end of the bushing having supporting means for this end of the rollers.

13. In a wheel construction, the combination of a hub part adapted to be sleeved over the end of an axle having a peripheral groove, a bushing for the hub part, means for removably securing the bushing to the hub part, a key block within the hub part to engage the annular groove of the axle, roller bearings interposed between the bushing and axle, the bushing having a closed end constituting an abutment for the key block and also retaining means for the rollers, a removable closure for the opposite end of the bushing having supporting means for this end of the rollers, and a metallic lining interposed between the rollers and bushings.

14. In a wheel construction, the combination of a hub part having a closed end adapted to be sleeved over the end of an axle, a removable bushing for the hub part, rollers supported by the bushing to engage the axle, locking means at a point without the bushing between the hub part and axle, the bushing having oil passages, and the hub having a normally closed oil inlet communicating with said passages.

15. In combination, a wheel having a hub to be inserted over the end of an axle, an internal key block for the hub to engage the axle and prevent separation of the hub from the axle, a removable bushing interposed between the hub and the axle and constituting a retaining means for said key block, and roller bearings interposed between the bushing and axle, the said bushing having means for supporting the roller bearings in place upon the removal of the wheel.

16. In a wheel construction, the combination of a closed end hub part adapted to be sleeved over the end of an axle having a peripheral groove adjacent said end, a bushing within the hub adapted to terminate at its outer end at a point within the end of the axle, bearings adapted to be interposed between the bushing and axle, and a key block projecting over the outer end of the bushing and fitted to the hub whereby to engage the peripheral groove of the axle.

17. In combination, a wheel hub adapted to be sleeved upon the end of an axle, said axle having a peripheral groove, a bushing interposed between the peripheral wall of the hub and axle, roller bearings interposed between said bushing and axle, and an abutment member overlying the outer end of the bushing and engaging said peripheral groove of the axle, and the hub having a part to receive said abutment member.

In testimony whereof I hereunto affix my signature in the presence of two witnesses.

ALFRED BRYANT DAY.

Witnesses:
L. O. SCOTT,
W. C. ANDERSON.